(12) United States Patent
Braun et al.

(10) Patent No.: US 12,165,212 B1
(45) Date of Patent: *Dec. 10, 2024

(54) METHOD AND SYSTEM FOR PROCESSING INSURANCE CLAIMS USING AUGMENTED REALITY VIDEO DATA

(71) Applicant: United Services Automobile Association (USAA), San Antonio, TX (US)

(72) Inventors: Florian Braun, San Antonio, TX (US); Andre Buentello, San Antonio, TX (US); George MacNair, San Antonio, TX (US); Sharon Haverlah, Bulverde, TX (US); John Chandler Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,319

(22) Filed: Dec. 2, 2022

Related U.S. Application Data

(63) Continuation of application No. 16/841,185, filed on Apr. 6, 2020, now Pat. No. 11,532,051, which is a continuation of application No. 13/777,984, filed on Feb. 26, 2013, now abandoned.

(60) Provisional application No. 61/603,735, filed on Feb. 27, 2012.

(51) Int. Cl.
*G06Q 40/08* (2012.01)
(52) U.S. Cl.
CPC .................... *G06Q 40/08* (2013.01)

(58) Field of Classification Search
CPC ........................................... G06Q 40/08
USPC .............................................. 705/4
See application file for complete search history.

(56) References Cited

U.S. PATENT DOCUMENTS

| | | |
|---|---|---|
| 2008/0306996 A1 | 12/2008 | McClellan |
| 2009/0138290 A1 | 5/2009 | Holden |
| 2011/0218825 A1 | 9/2011 | Hertenstein |
| 2012/0075168 A1 | 3/2012 | Osterhout |
| 2012/0076437 A1* | 3/2012 | King ............... G06Q 40/08 |
| | | 382/286 |
| 2012/0078686 A1 | 3/2012 | Bashani |
| 2012/0249797 A1* | 10/2012 | Haddick ............ G04G 21/04 |
| | | 701/491 |

(Continued)

FOREIGN PATENT DOCUMENTS

WO         2021179678 A1     9/2021

OTHER PUBLICATIONS

1. Authors: Mona Singh et al; Title: Augmented Reality Interfaces; Publisher: IEEE; Date of Publication: Dec. 12, 2013; (Year: 2013).*

(Continued)

*Primary Examiner* — Bruce I Ebersman
*Assistant Examiner* — Hatem M Ali
(74) *Attorney, Agent, or Firm* — BakerHostetler

(57) ABSTRACT

Techniques utilize augmented reality to identify anomalies in properties or structures based thereon. Augmented reality video glasses can be authenticated and provided stored data of a property in an undamaged state. Imagery of the property can be collected using the augmented reality video glasses. An anomaly associated with the property can be determined.

20 Claims, 7 Drawing Sheets

(56) References Cited

U.S. PATENT DOCUMENTS

2013/0204645 A1    8/2013   Lehman
2014/0368378 A1   12/2014   Crain
2021/0179678 A1    6/2021   Fiedler

OTHER PUBLICATIONS

2. Authors: Gaurav Raj et al; Title: Application and scope analysis of Augmented Reality in marketing using image processing technique; Publisher: IEEE; ate Added to IEEE Xplore: Jul. 9, 2016 . . . (Year: 2016).*
1. Authors: Mona Singh et al; Title: Augmented Reality Interfaces; Publisher: IEEE; Date of Publication: Dec. 12, 2013; (Year: 2013) (Year: 2013).*
2. Authors: Gaurav Raj et al; Title: Application and scope analysis of Augmented Reality in marketing using image processing technique; Publisher: IEEE; ate Added to IEEE Xplore: Jul. 9, 2016 . . . (Year: 2016) (Year: 2016).*
Leveraging Machine Learning and Big Data for Smart Buildings: A Comprehensive Survey by Qolomany, Basheer; Al-Fuqaha, Ala; Gupta, Ajay; Benhaddou, Driss; Alwajidi, Safaa; Qadir, Junaid; Fong, Alvis C.; http://arxiv.org/licenses/nonexclusive-distrib/1.0/ (Year 2019).
Fundamentals of IoT and Wearable Technology Design by Haider Raad; Wiley-IEEE Press 2020 (Edition: 1, pp. 282) (Year: 2020).
Handbook of Digital Forensics of Multimedia Data and Devices by Anthony T. S. Ho; Shujun Li; Wiley-IEEE Press 2015 (Edition: 1, pp. 704) (Year: 2015).

* cited by examiner

METHOD AND SYSTEM FOR PROCESSING INSURANCE CLAIMS USING AUGMENTED REALITY VIDEO DATA

CROSS-REFERENCES TO RELATED APPLICATIONS

This application claims priority to and is a continuation of U.S. patent application Ser. No. 16/841,185, filed Apr. 6, 2020, and claims priority to U.S. patent application Ser. No. 13/777,984, filed Feb. 26, 2013 and claims priority to U.S. Provisional Patent Application No. 61/603,735, filed on Feb. 27, 2012, entitled "Method and System for Processing Insurance Claims Using Augmented Reality Video Data," the disclosure of which is hereby incorporated by reference in its entirety for all purposes.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to insurance systems. More specifically, the present invention relates to methods and systems for utilizing augmented reality data to process insurance claims. The methods and techniques can be applied to a variety of other environments and contexts.

According to an embodiment, a method comprises providing augmented reality video glasses comprising a frame configured for wear by a wearer, at least one camera, at least one partially transparent lens integrating a display subsystem, wherein the display subsystem is configured to display data from a remote device using the at least one partially transparent lens, and a communication interface configured to transmit information collected by the augmented reality video glasses; authenticating, using the augmented reality video glasses, a wearer to a remote database; providing, to the augmented reality video glasses, stored data of a property in an undamaged state; collecting, using the at least one camera of the augmented reality video glasses, imagery of the property; displaying, to the wearer of the augmented reality video glasses using the at least one partially transparent lens, at least a portion of the stored data describing the property in an undamaged state; comparing the imagery of the property to the data describing the property to determine at least one anomaly associated with the property; wherein displaying data describing the property comprises overlaying imagery of the data describing the property on corresponding portions of the property through the augmented reality video glasses; and reporting the at least one anomaly to a user.

According to another embodiment, a non-transitory computer-readable storage medium comprising a plurality of computer-readable instructions tangibly embodied on the computer-readable storage medium, which, when executed by a data processor, report an anomaly regarding a property. The plurality of instructions comprise instructions that cause the data processor to authenticate, using information collected by the augmented reality video glasses, the wearer to a remote database; instructions that cause the processor to provide, to the augmented reality video glasses, stored data of a property in an undamaged state; instructions that cause the data processor to collect, using the at least one camera of the augmented reality video glasses, imagery of the property; instructions that cause the data processor to display, to the wearer of the augmented reality video glasses using the at least one partially transparent lens, data describing the property in an undamaged state; instructions that cause the data processor to compare the imagery of the property to the data describing the property to determine at least one anomaly associated with the property, wherein displaying data describing the property comprises overlaying imagery of the data describing the property on corresponding portions of the property through the augmented reality video glasses; and instructions that cause the data processor to report the at least one anomaly to a user.

According to another embodiment, a system is configured to execute instructions. The instructions effectuate authenticating, using information collected by augmented reality video glasses, a wearer to a remote database, wherein the augmented reality video glasses comprise a frame configured for wear by the wearer, at least one camera, at least one partially transparent lens integrating a display subsystem, wherein the display subsystem is configured to display data from a remote device using the at least one partially transparent lens, and a communication interface configured to transmit information collected by the augmented reality video glasses; providing, to the augmented reality video glasses, stored data of a property in an undamaged state; collecting, using the at least one camera of the augmented reality video glasses, imagery of the property; displaying, to the wearer of the augmented reality video glasses using the at least one partially transparent lens, at least a portion of the stored data describing the property in an undamaged state; comparing the imagery of the property to the data describing the property to determine at least one anomaly associated with the property; wherein displaying data describing the property comprises overlaying imagery of the data describing the property on corresponding portions of the property through the augmented reality video glasses; and reporting the at least one anomaly to a user.

Numerous benefits are achieved by way of the present invention over conventional techniques. For example, embodiments of the present invention provide methods and systems that increase the speed of claims processing and reduce the costs associated with claims processing. These and other embodiments of the invention along with many of its advantages and features are described in more detail in conjunction with the text below and attached figures.

DETAILED DESCRIPTION OF SPECIFIC EMBODIMENTS

Figure 1:
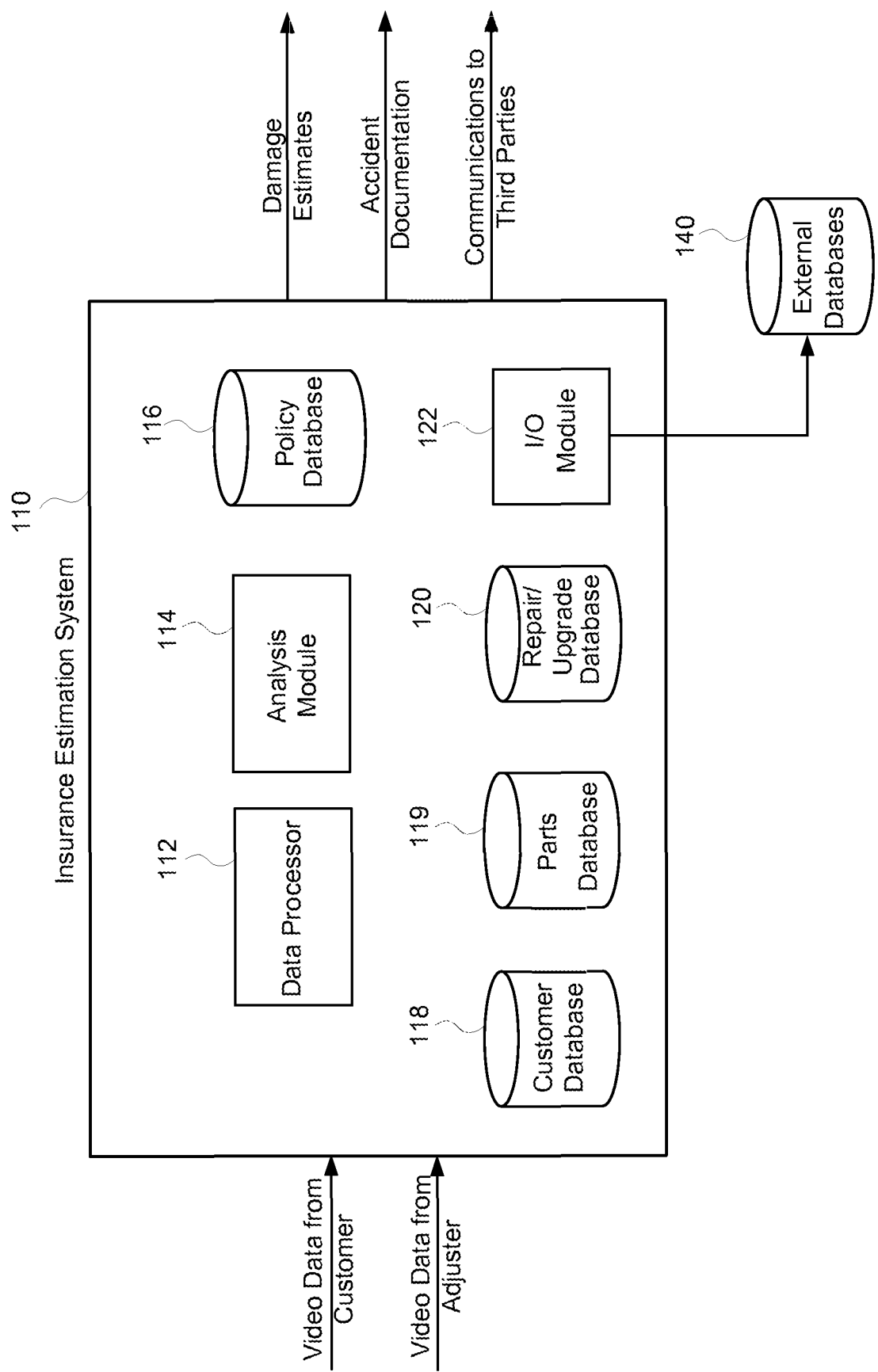
FIG. 1 is a high level block diagram of an insurance estimation system utilizing video data according to an embodiment of the present invention.

Embodiments of the present invention relate to technologies to facilitate homeowners and/or renters in finding, acquiring, insuring, and/or maintaining real property. Technologies related to embodiments of the present invention support a homeowner/renter, for example, a member of USAA, with the initial preparation associated with the purchase of a home and/or rental of a home/apartment. Such initial preparation can include advice and counseling related to a person's ability to afford a home or apartment, development of a financial plan to facilitate the acquisition, web-enabled self-service systems (e.g., home purchase calculators) used to determine financial goals and requirements, and/or on-line member communities related to homeownership and/or rental.

After a person completes initial preparation, technologies related to embodiments of the present invention assist the person in finding suitable properties through the use of rent/buy listings including information tailored to each person's interests and background. For example, preapproval of the person for mortgage rates and/or homeowner's/renter's insurance can be used to provide rich information content as part of the search process. On-line member communities can be used to assist users in finding property that is suitable for the particular user's interests and income.

Additionally, technologies related to embodiments of the present invention provide for assistance in the purchase/rental transaction, including obtaining a mortgage and provision of assistance in negotiating the purchase or lease. Protection of the newly acquired home or rented property is also related to embodiments of the present invention, in one of several forms including homeowner's insurance, mortgage life insurance, renter's insurance, flood insurance, personal property insurance, home security systems, home warranties, and the like.

Moreover, technologies related to embodiments of the present invention provide a person with assistance in moving to, maintaining and/or renovating, and/or refinancing the newly purchased or rented property. Thus, embodiments of the present invention relate to technologies that provide a one-stop home resource for delivering home solutions related to buying, selling, renting, and/or owning real property. In particular embodiments, members of a membership organization (e.g., USAA) utilize the methods and systems described herein to manage their real property interests and interact with other community members to enable new concepts related to homes and other real property.

With conventional automobile insurance policies, when the insured is involved in an automobile accident, they typically contact their insurance company and provide an initial loss report. In some cases, the insured is directed to a body shop that has a relationship, typically contractual, with the insurance company. Such a body shop, working as an agent of the insurance company, prepares an estimate of the damage resulting from the accident, which is provided to the insurance company. Upon approval from the insurance company, the body shop can perform repair work.

FIG. 1 is a high level block diagram of an insurance estimation system utilizing video data according to an embodiment of the present invention. According to embodiments of the present invention, video data, including augmented reality data is utilized to increase the efficiency of the damage inspection process in a variety of insurance contexts including automobile insurance, home owner's insurance, renter's insurance, and the like. Embodiments enable more accurate and timely creation of damage estimates and improve communications between the insured, the insurance company, third party providers, and the like. In some embodiments, the insured provides data typically provided by an adjuster or a repair facility, reducing cost and improving the efficiency with which claims processing data is collected. In some embodiment, the user experience provided to the insured is improved by using the methods and systems described herein.

Referring to FIG. 1, an insurance estimation system 110 is provided and is useful for receiving and processing insurance claims data. As illustrated in FIG. 1, data is received from one or more sources such as video data from a customer (i.e., an insured person), video data from an adjuster, or the like. Although two data sources are illustrated, embodiments of the present invention are not limited to these particular data sources and other source of data are included within the scope of the present invention. The system 110 includes a data processor 112 operable to receive data, including video data, and one more databases, including a policy database 116 that can include information on insurance policies offered by an insurance company, a customer database 118, which can include information on customers of the insurance company, and an analysis module 114.

The system 110 illustrated in FIG. 1 also includes additional databases including information on auto repair (parts database 119) and home repair (repair/upgrade database 120). In some embodiments, one or more external databases 140 are utilized and can communicate with the system 110 through an I/O module 122, which can also provide functionality related to receiving inputs such as the video data and provide outputs as illustrated in FIG. 1 and discussed below.

The insurance estimation system 110 provides one or more outputs including damage estimates, which are computed by the analysis module 114 in some embodiments in conjunction with the various data inputs and the various databases. In addition to estimates, outputs can include documentation related to an accident, communications to third parties such as repair facilities, communications to the insured, and the like. Although three outputs are illustrated, embodiments of the present invention are not limited to these particular outputs and other outputs are included within the scope of the present invention.

Figure 2:
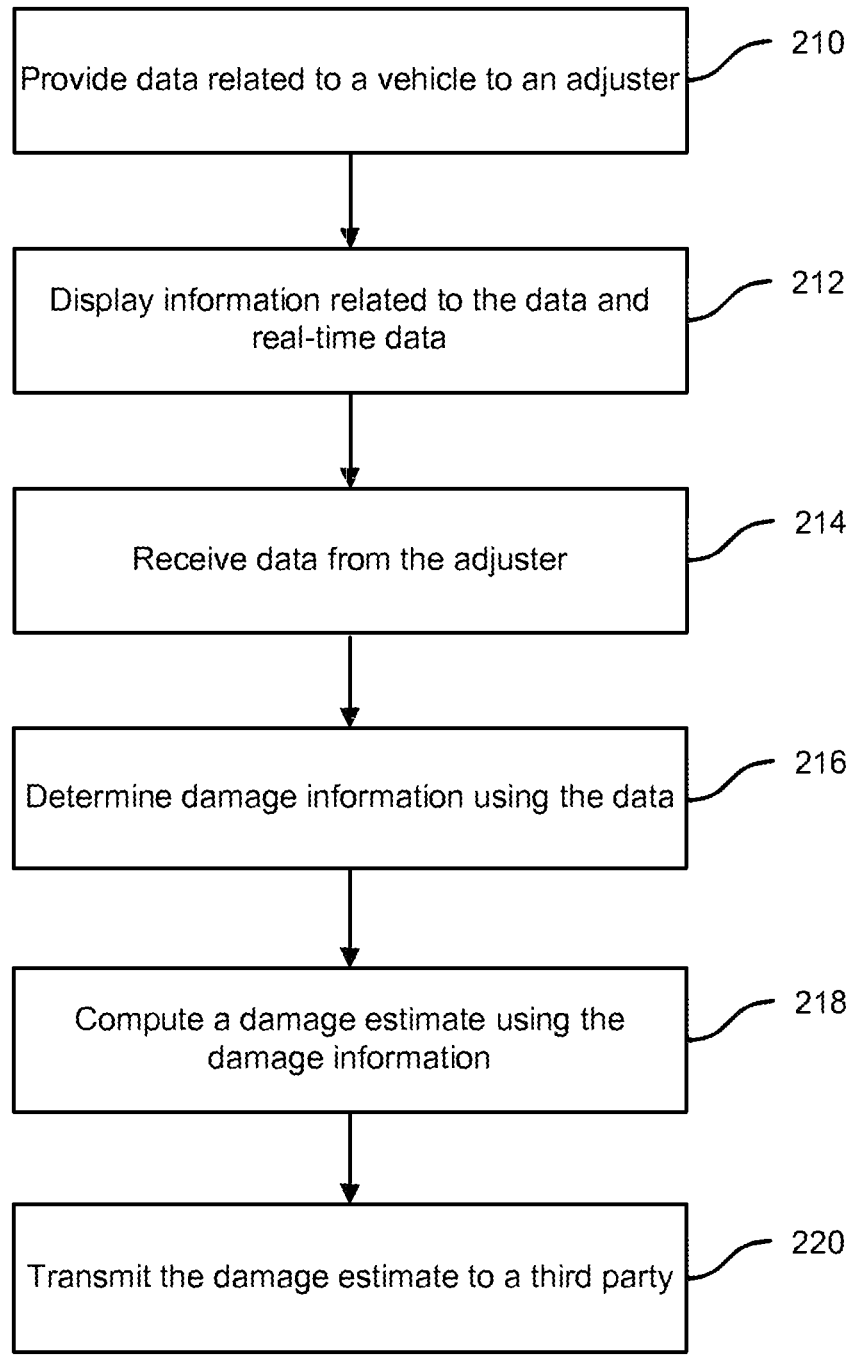
FIG. 2 is a high level flowchart illustrating a method of estimating automobile damage using adjuster data according to an embodiment of the present invention.

FIG. 2 is a high level flowchart illustrating a method of estimating automobile damage using adjuster data according to an embodiment of the present invention. Referring to FIG. 2, video glasses are utilized by an adjuster to provide insurance claims processing data to an insurance claims processing system. Video glasses, which can also be referred to as augmented reality glasses, VR headsets, and the like, are devices that allow a user to record a video that is overlaid with additional data, providing a virtual reality experience. Examples of video glasses include the Vuzix display Wrap 920AR augmented reality glasses available from Vuzix Corporation of Rochester, NY, the ST 1080 available from Silicon Micro Display, Inc. of Cambridge, MA, the JST 3D shutter glasses available from Shenzhen Jingsheng Technology Co., Ltd. of Shenzhen China, the Sensics SmartGoggles available from Sensics, Inc. of Columbia, MD, and the like. In some implementations, the video glasses utilize a video camera, which can also obtain still images, in conjunction with a display system that enables the user to view a surrounding scene, which can be overlaid with various forms of data. Thus, a user can view the scene through projection of the data from the camera using a display system, using partially transparent lenses, or the like. Although some embodiments are discussed in terms of augmented reality displays in the form of video glasses, transparent lenses, smart phones, and the like, embodiments of the present invention are not limited to these particular examples. Rather, embodiments of the present invention include display technologies that provide augmented reality functionality, for example, contact lenses with included screens, projection of images into the eye, and the like. One of ordinary skill in the art would recognize many variations, modifications, and alternatives.

In some embodiments, authentication functions can be performed in conjunction with the video glasses, for example, when the user (e.g., an adjuster, an insured customer, or the like) puts the glasses on, facial recognition or other authentication technology including biometric authentication techniques, for example, using a user-facing camera in the video glasses, can authenticate the user and log them into the appropriate computer system. This can save steps in a log-in process. In other embodiments, an authenticated device such as a mobile device can communicate with the video glasses for authentication. As an example, using Bluetooth or RFID capabilities, a mobile phone could be used in the authentication process.

The method includes providing data related to a vehicle to an adjuster (210). An adjuster using video glasses is able to inspect a vehicle with an overlay of the image of the undamaged vehicle presented in conjunction with real-time images of the video (212). As an example, the adjuster can travel to the location of the damaged vehicle and inspect the vehicle using video glasses that enable the adjuster (i.e., an inspector) to overlay the image or other data related to the undamaged vehicle with the video data collected of the actual vehicle that sustained damage. The system is able to receive data from the adjuster (214), recognize damage that has been sustained as part of determining damage information using the data received from the adjuster (216), calculate a damage estimate (218) including an estimate to repair the damage. The data provided can include the types of repairs that are appropriate, thereby assisting in the claims process, for example, by providing a more accurate and faster claims process. Additionally, documentation related to the damage can be provided as part of the process. Accordingly, the damage estimate can be provided to a third party (220), which can be the person that is insured, a repair shop, other insurance companies, or the like.

In a particular embodiment, the overlay of the real-time and stored data includes an overlay in augmented reality of a CAD outline of the vehicle, which can be registered to the real-time image of the vehicle using a camera, a laser or other optical system, or the like. By overlaying the CAD "blueprint" of the undamaged area with real-time images of the damage, parts that are damaged can be determined, enabling computation of the estimate to repair the damage. Using the overlay of the damaged part of the vehicle and the CAD drawing of the undamaged vehicle, damage can be estimated for particular vehicle types, providing more accurate estimates. In some embodiments, the adjuster can virtually "touch" the damage, enumerating locations on the overlay or the schematic in which the parts are damaged. Accordingly, an itemized list of the parts that need repair can be generated, without the adjuster having to access vehicle information and manually list parts in need of repair, increasing the accuracy and efficiency of the damage estimation process. Additional description related to vehicle analysis is provided in U.S. patent application Ser. No. 12/969,317, filed on Dec. 15, 2010, the disclosure of which is hereby incorporated by reference in its entirety for all purposes.

In an alternative embodiment, a mechanic at an auto-body shop, a field adjuster, or the like, can wear the video glasses, which can have a camera integrated therein, be partially transparent to provide the user with a view of the surrounding scene with an augmented reality overlay, utilize a display screen to reproduce the scene viewed by the camera, or the like. Additionally, a communications medium can be utilized to provide data to the insurance company, the insured, third party providers, and the like. In one example, a video feed from the video glasses is provided to the insurance company as a supplement to or in addition to data provided by a repair facility, enabling verification of other information provided by the repair facility. Although embodiments of the present invention are discussed in relation to video glasses used by an adjuster, use is not limited to an adjuster and other people, including the insured, could utilize the video glasses, which may be provided with a communications system such as a mobile chipset or may utilize other communications systems, such as mobile phones, a mobile computer, using WiFi communications, a wired communications link, or the like. Processing of the damage estimation can be performed by the remote system, by systems operated on behalf of the insurance company, or the like. Thus, embodiments of the present invention include software of running on the video glasses or the use of the video glasses as the data collection and display component of the system, with processing being performed after data collected using the video glasses is transmitted to the insurance estimation system. One of ordinary skill in the art would recognize many variations, modifications, and alternatives.

It should be appreciated that the specific steps illustrated in FIG. 2 provide a particular method of estimating automobile damage using adjuster data according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Various modifications of the process illustrated in FIG. 2 can be utilized during the claims adjustment process. As an example use case, a claims adjuster can put on their video glasses as they get in their vehicle in order to travel to a location of an auto claim. The glasses can perform authentication of the adjuster and access a database including a schedule of work items. Location information on the next work item can be communicated to the adjuster, with the video glasses potentially interacting with other systems in the vehicle to assist the adjuster in getting to the desired location. As an example, the video glasses could interact with the vehicle navigation system.

When the adjuster arrives at the damaged vehicle, information on the customer can be used to determine a list of insured vehicles. Through an automatic process or by receiving a selection of the vehicle from a list of vehicles, information on the vehicle that is to be adjusted is obtained, populating appropriate data fields.

Upon arrival, the video glasses can be used in damage assessment, comparing the damaged vehicle to an undamaged vehicle and calculating differences and, therefore, the damage. Through augmented reality, the adjuster is able to look through the video glasses at the damaged vehicle and that image can be overlaid with data for a vehicle that is not damaged. A database can be accessed with schematics for vehicles. The schematics for the vehicle of interest can be obtained and loaded into the video glasses. As the claims adjuster looks at parts that are bent, broken, damaged, or the like, the parts can be identified and noted, logging the parts that need to be replaced and generating a list of damaged parts. Alternatively, based on a comparison between wireframes of undamaged and damaged parts, a calculation can be made of which parts are needed, the labor required to repair the damage, and an estimate can be generated in real time based on the damage data. As an example, data from the video glasses can be used to compare the vehicle to the vehicle when it was manufactured, enabling determinations of whether or not the frame is bent, whether or not it's a total loss, or the like based on the difference between the manufacturer specifications and then the current state. Provided with a list of suggested parts, the adjuster can, for example, through interactive gestures, adjust the list as needed, and then confirm it, and pull the data of how much these parts cost, the labor costs, and generate an estimate to repair the damage. In some implementations, the procurement process can utilize the part data, generating the appropriate parts orders. In summary, the overlay allows the adjuster to determine the parts that are damaged, generate estimates using the system, and even order parts with approval from the adjuster.

In some cases, if the adjuster was able to determine onsite that there was a significant amount of damage, enough to total that car, the insurer could close out the claims process immediately, shortening the adjustment cycle. If the damage is less than the threshold at which the vehicle is totaled, estimates from repair facilities can be solicited and made readily available to the customer. As an example, if the insured has a computing device, the itemized list can be provided and displayed as it is generated, along with the estimates, enabling a shortened decision cycle. It should be noted that data and telemetry available in the vehicle's computer systems can be provided to the video glasses or other suitable system and integrated with data from the video glasses. As an example, the data that the adjuster is obtaining, the data that is generated using the video glasses, data from the insured's databases, and data from the vehicle can be integrated as part of the claims adjustment process according to embodiments of the present invention. One of ordinary skill in the art would recognize many variations, modifications, and alternatives.

Figure 3:
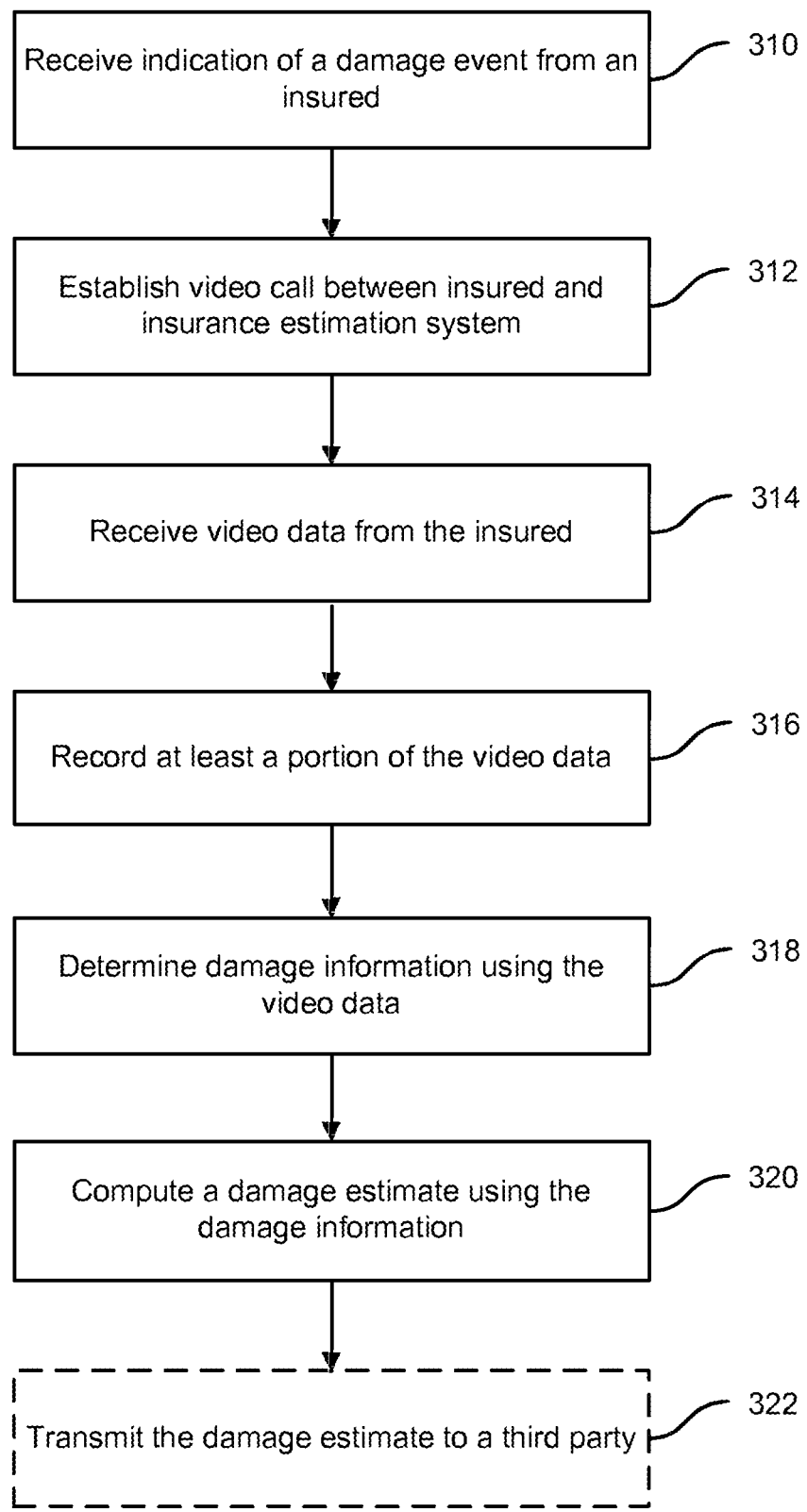
FIG. 3 is a high level flowchart illustrating a method of estimating automobile damage using video data according to an embodiment of the present invention.

FIG. 3 is a high level flowchart illustrating a method of estimating automobile damage using video data according to an embodiment of the present invention. In the embodiment illustrated in FIG. 3, an insured person utilizes a mobile device with video calling capability to provide claims processing information to the insurance estimation system. As an example, after an accident occurs, the insured, using a video calling application running on the mobile device, can initiate a video session with the insurance company or their agent, providing a video stream that can be used by the insurance company or their agent to analyze the damage sustained during the accident. In these embodiments, the insurance claims adjusting process is simplified since the insured can provide data that is typically provided by an adjuster, a body shop, or the like. In some embodiments, the video call enables a person or a machine at the insurance company to remotely provide instructions to the insured in relation to the information that is appropriate for collection, facilitating the damage estimation process. In some implementations, software running on the mobile device can be used to overlay the CAD diagram of the vehicle with video data collected using the mobile device. Alternatively, the video can be transmitted from the mobile device with the overlay performed after the video data is transmitted to the insurance estimation system.

In some embodiments, video of the damaged vehicle received from the insured is sufficient to estimate the damage, analyze the damage, document the damage, create an estimate, and the like. Using the methods and systems described herein, the insured is able to provide data to the insurance company that can be used to estimate damage, reducing the need for an adjuster to actually be present with the vehicle, since the insured can transmit video data related to the vehicle to the insurance company or other suitable entity.

Referring to FIG. 3, the method includes receiving an indication of a damage event from the insured (310). In some implementations, this process includes the insured contacting the insurance company using a mobile device such as a mobile phone, the vehicle automatically initiating communications as a result of an accident, or the like. The method also includes establishing a video call between the insured and the insurance estimation system (312). In an embodiment, an adjuster from the insurance company participates in the video call with the insured. Video data is received from the insured (314), a process that can include the insured receiving instructions from the adjuster, enabling accurate information to be obtained by the adjuster through the video stream associated with the video call. As an example, the adjuster could instruct the insured to provide video data for different portions of the vehicle. Using embodiments of the present invention, the adjuster remote from the vehicle is provided with a virtual presence at the vehicle, enabling the user to be instructed in obtaining desired perspectives of the damaged vehicle. In addition to damage to the vehicle, other data related to the accident can be obtained, including skid marks, telemetry from the accident site, or the like. In some implementations, data collected by the vehicle before, during, and after the accident can be transmitted independently, as part of the video stream, or supplemental to the video stream, enabling the "black box" data from the vehicle to be made available to the insurance estimation system.

In some embodiments, an app running on the mobile device can be used to provide instructions to the insured in relation to collecting the video stream. Additionally, some processing can be performed at the mobile device, for example, overlaying a wire frame of the undamaged vehicle over the damaged vehicle in order to collect the video data at a desired perspective. In some embodiments, the wire frame can be modified in response to the video data, adjusting the wire frame to more closely align with the video data, facilitating registration between the CAD model and the actual damaged vehicle.

The method further includes recording at least a portion of the video data (316), determining damage information using the video data (318), and computing a damage estimate using the damage information (320). In some implementations, recording of the video data is optional in addition to an optional process of transmitting the damage estimate to a third party (322). In some implementations, processes discussed in relation to FIG. 2 are utilized in relation to FIG. 3 and vice versa. One of ordinary skill in the art would recognize many variations, modifications, and alternatives.

Because embodiments of the present invention provide and utilize real-time video of vehicle damage, real-time damage estimates can be obtained and transmitted to various repair facilities, enabling the insurance company to receive multiple real-time quotes that are dependent on the repair facilities workload, backlog, or the like. Thus, rather than the potential repair facilities being limited to repair facilities having existing relationships with the insurance company, a wider selection of repair facilities is provided to the insured. Although the video calls are discussed in terms of the insured, other parties can participate in the video call, including an agent of the insurance company, repair shop personnel, or the like. Although some embodiments are discussed in relation to video data, still image data can also be utilized. One of ordinary skill in the art would recognize many variations, modifications, and alternatives.

It should be appreciated that the specific steps illustrated in FIG. 3 provide a particular method of estimating automobile damage using video data according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Various modifications of the process illustrated in FIG. 3 can be utilized during the claims adjustment process. As an example use case, an insured customer wearing the video glasses can collect data typically collected by the adjuster. A customer service representative could instruct the insured to look at portions of the vehicle, providing the vehicle data to the representative so that it can be used in the claims adjustment process, thereby providing a virtual adjuster at the vehicle location. The representative will effectively be able to see what the insured sees through the video feed from the video glasses. Through augmented reality, the representative and the insured can work together on assessing the damage, identifying the parts, and generating estimates, etc. With the insured at the vehicle using the video glasses, the representative, in verbal communication with the insured, is able to virtually be at the vehicle location.

Embodiments of the present invention are not only limited to analysis of damage after an accident, the methods and systems discussed herein are applicable to quality assurance applications. As an example, after a repair has been completed, the insured or other party can perform a quality assurance check using the video glasses that enable a comparison between the repaired vehicle and the CAD specifications, thereby enabling the insured to verify that the repairs were completed to their satisfaction. In some implementations, the system can validate the repair of the damage for the insured remotely. As an example, if the insured is not available to inspect the repair, a person can use the video glasses to provide data used in a virtual assessment of the repair, confirming that the repairs are in fact complete. Thus, embodiments of the present invention are applicable to detecting damage to the car as well as check that the repairs are done properly, with the car's structure matching the template after the repair is performed.

Embodiments of the present invention enable the claims process to be streamlined, with damage assessed and repair costs estimated quickly, thereby providing the insured with reimbursement for the damage in order to close out the claims process. Additionally, embodiments of the present invention are not limited to use after vehicle accidents. As an example, before and/or after renting a car or using a shared ownership vehicle, a user could perform a pre-use inspection, collecting data related to the vehicle, which can be used to document pre-use damage, demonstrate that the vehicle was not damaged during rental, or the like. In some embodiments, the insurance company underwriting the insurance policy on the vehicle could utilize this data to determine the pricing structure for the insurance policy. As another example, preventative maintenance inspections can be performed using the video glasses, enabling the insured to check characteristic of the vehicle, for example, playing a video through the video glasses to enable the insured to check certain points on the car. The video glasses could provide validation that the insured is performing these periodic checks on their vehicle. Thus, augmented reality glasses can be used in performing vehicle inspections that can be reported back to the insurer, potentially lowering the insured's premiums. In these scenarios, the user can be led through the inspection using augmented reality, providing the user with a CAD model of the vehicle. Additionally, fraud reduction can be enhanced by the insured providing a pre-insurance inspection to provide a baseline on the state of the vehicle prior to the insurance policy being issued.

Embodiments of the present invention are applicable, not only to vehicle damage assessment but also to other forms of property, including real property, structures, homes, buildings, and the like. After a damage event, an inspector or adjuster is able to walk through a building or other structure using video glasses. The video feed captured by the video glasses can be recorded while the scene is viewed and through one or more input methods, the inspector could overlay data on the video feed, for example, leaving notes in the video feed related to damaged areas, concerns, objects that are to be highlighted, or the like. In some embodiments, software (e.g., object recognition) is used to utilize these inputs in identifying objects and determining damage based on the data collected at the scene. In some implementations, an estimate can be created in a more efficient and cost effective manner. Thus, embodiments of the present invention are able to examine damaged areas and record information that can be used in real-time to generate estimates and lists of damaged items based on object recognition software or inputs that are provided by the inspector or adjuster.

In addition to an estimate, systems described herein can be used to provide information useful to contractors, generating bills of material, ordering materials, analyzing virtual upgrades to fixtures and features, providing a baseline for the property, and the like. During the damage analysis process, the insured could be presented with options for upgrades based on the information obtained by these systems, including estimates, upgrade costs, amounts and items insured, and the like. One of ordinary skill in the art would recognize many variations, modifications, and alternatives.

Since property records may be maintained by city, country, and other government or private entities, data related to the property records can be used with the systems described herein or integrated into the data collected as described herein. As examples floor plans or architectural drawings of the house that were made available could be accessed and used to construct a 3D representation of the home in real-time during the analysis, enabling comparisons between design criteria, actual construction, damage, and the like.

In some embodiments, for example, expensive homes, appraisers could utilize the systems described herein in the initial appraisal process for the home during which the insurance parameter are determined or verified. The "before" data related to the home can then be used in generating an assessment of the value of the house and furnishing, etc. If the home experiences a damage event, the "before" data could be utilized in a comparison performed after the damage event, enabling an assessment of the impact of the damage. Such systems are also applicable to offices, commercial facilities, and the like.

In some implementations, a member communications module is provided that enables the inspector or adjuster performing the inspection to make data, including videos to interact with the claims personnel of the insurance company as well as the insured customer. In some embodiments, the member may be able to provide feedback during the inspection based on the data collected, with options for repairs being presented to the insured in real time, enabling the insured to have a restoration view of the structure, including the interior, modified as appropriate by the various options selected by the insured.

As additional examples, a user utilizing the augmented reality glasses could view augmented reality lines overlaid on their lawn or other property, defining an area in compliance, for example, with California's 100 foot defensible space regulations. As another example, a user utilizing the augmented reality glasses could capture imagery for use with "Google Street View" type archiving. A separate use case could include maintenance technicians wearing glasses that would overlay graphics, gauges, signage, or the like over infrastructure entities including, but not limited to, pipes, electrical chases, and the like. By overlaying CAD drawings over images of structures including vehicles, real property, and the like, the real view is provided to the user as well as an augmented view, a specification view, combinations thereof, or the like. In a manner similar to that discussed in relation to vehicles, damage to a building can be analyzed since the CAD design would not overlay properly with the actual building.

Thus, embodiments of the are suitable for use in identifying Water Leaks, Water Damage, Mold Potential, Inadequate insulation, blockage in pipes and plumbing, air distribution blockage and damaged ductwork, and the like. Using thermal imaging, detection of insect damage can be accomplished as well as detection of electrical faults. Thermal imaging of electrical circuits can detect: Identifies overloaded circuits, loose/corroded connections and failing breakers in electrical panels; blown fuses, overloads, phase imbalance and harmonics problems; hot spots from high resistance connections, and the like. In an embodiment, an adjuster equipped with video goggles/thermal imaging is able to detect damage that the naked eye is not capable of detecting. Upon detecting an anomaly, the adjuster is able to capture images of the damage and paste it directly into an appraisal document. Some embodiments of the present invention are not limited to use of augmented reality glasses by people, but can be used in autonomous vehicle applications including drone piloting and image capture. As an example, the piloting of a robotic drone for roof inspection can be performed with an image of damaged roof shingles being visible through the video goggles. An adjuster equipped with a video goggle/drone piloting system is able to examine damage to a roof from the ground. An integrated application will allow the adjuster to pilot the drone, detect shingle damage, capture images of the damage and paste the images into an appraisal document. Additional functionality would use thermal imaging to detect water damage to the substrate. Further functionality would auto detect damage and provide roof dimensions for a replacement cost estimate calculation.

Moreover, embodiments of the present invention are suitable for use in demonstrating anti-counterfeit mechanisms of checks and currency that can be seen with the video/goggles passed by a UV light source. As an example, a bank teller could run apps that check for re-presentment fraud and signature verification. All detection can be done in the presence of customer in some embodiments as well as facial recognition for identification of customers or to perform a criminal database check. As another example, video goggles can be used in Supply/Procurement Personnel applications, enabling the Supply or Procurement personnel to locate items; inventory items; and track items via barcodes without having to carry around a handheld barcode scanner. The video goggle equipped personnel could simply look at the item's UPC or 2D barcode through the video goggles and the inventory application would provide descriptions and other logistic information by referencing the database information via, for example, the barcode.

As an additional example, embodiments of the present invention are suitable for uses in which the video glasses provide an overlay of interactive instruction related to a physical object. For example, a user having an issue or question related to a particular product could use the video glasses to display a real-time interactive instruction overlay that could guide the user through a step by step procedure with the product. Thus, embodiments enable a user to interact with a product while reviewing/receiving directions, instructions, guidance, or the like instead of having to refer to a physical manual or online reference. In an insurance claims context, when documenting an accident and/or filing a claim, the system could walk the user, step by step, through all necessary processes, including describing and highlighting what information to collect, how to complete forms, whom to contact, and the like. Utilizing embodiments of the present invention, an integrated claims process is provided that can be used by adjusters, service representative, the insured, combinations thereof, and the like to review procedures, request and receive help, and/or review guidance or instructions.

Figure 4:
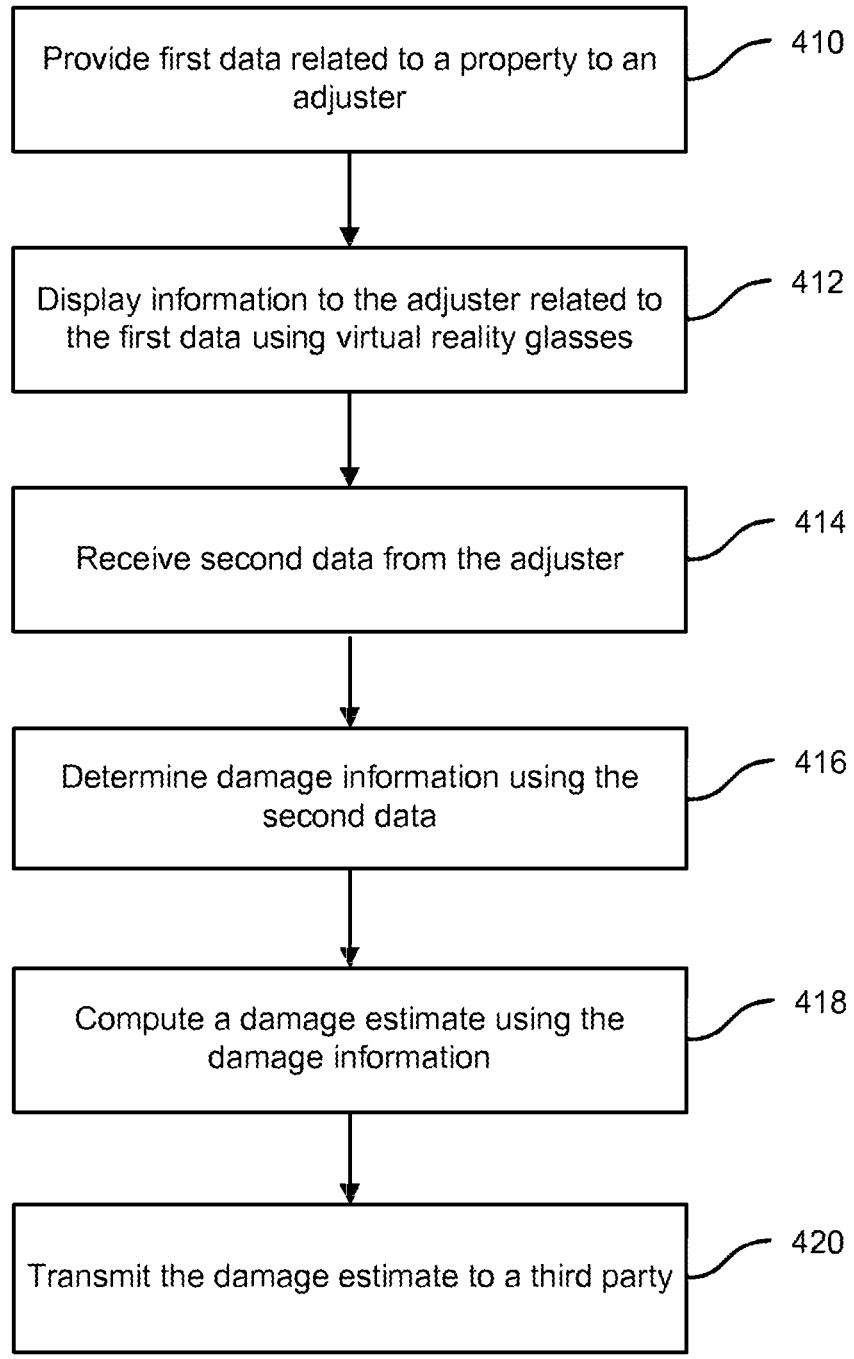
FIG. 4 is a high level flowchart illustrating a method of estimating structure damage using adjuster data according to an embodiment of the present invention.

FIG. 4 is a high level flowchart illustrating a method of estimating structure damage using adjuster data according to an embodiment of the present invention. As described herein, this method is useful in estimating property damage using adjuster data. The method includes receiving a communication from an insured related to property damage, for example to real property such as a home or other structure. An adjuster is sent to the location of the property and data related to the property is provided to the adjuster (410). As an example, the adjuster can use virtual reality glasses or augmented reality glasses to record areas of damage at the property. Thus, the method includes displaying, to the adjuster, information related to the data in conjunction with real-time data related to the property (412). The data related to the property can include wire frame data associated with an undamaged version of the property, for example, based on a CAD drawing of the home, floor plans, architectural models, of the like. Information display can be accomplished by overlaying video data from virtual reality or augmented reality glasses with the information. Additionally, data can be received from the adjuster (414), for example, as the adjuster makes notes in a video recorded using the virtual reality glasses.

The method also includes determining damage information related to the property using the data (416), computing, using a processor, a damage estimate using the damage information (418), and transmitting the damage estimate to a third party (420). The third party can be a contractor, the insured, or the like. In some embodiments, upgrade information can be received from a third party, either in real-time or subsequent to the method illustrated in FIG. 4. The video data can include visible light data as well as infrared or other non-visible wavelength data.

It should be appreciated that the specific steps illustrated in FIG. 4 provide a particular method of estimating structure damage using adjuster data according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention are not limited to damage assessment, but can also be used in identifying insurance risks during the viewing of the home using the video glasses. As an example, during a pre-purchase inspection or an appraisal, insurance risks associated with the home could be identified (e.g., distance between electrical sockets, leaks, etc.) increasing awareness for both the insurer and the insured. Risk mitigation activities can then be performed as appropriate to prevent future claim losses. In embodiments utilizing thermal imaging technology, heat pockets in a wall can be detected, indicating, for example, electrical or plumbing issues. An inspection checklist can be utilized in directing the inspection, providing insight into the condition of the home in addition to a damage assessment. Moreover, in some embodiments, data collected during the inspection can be used to highlight objects that could be suitable for coverage by other lines of insurance, such as additional personal property insurance. Additional description related to home inspection is provided in U.S. patent application Ser. No. 13/327,630, filed on Dec. 15, 2011, the disclosure of which is hereby incorporated by reference in its entirety.

Various modifications of the process illustrated in FIG. 4 can be utilized during the claims adjustment process. As an example use case, an adjuster wearing the video glasses can be directed to location of the property to be adjusted and use the video glasses during the process of inspecting the damage. In some implementations, while the adjuster inspects the property, the video feed can be recorded, along with information collected by the adjuster, including notes about damage on the property. Depending on the sensors available through the video glasses, thermal data can be collected to examine hot spots, water heater pipe breaks, gas leaks, electrical hot spots, or the like. Data collected during the inspection can be provided to the insurer and/or the insured, for example, in a condition when the insured is not able to enter the damaged property.

In the case of a natural disaster, the video glasses could be used to show the adjuster the property lines and other data related to the property including floor plans. Data can be accessed from a variety of sources including public records, private records, combinations thereof, and the like. Data related to previous claims can be utilized, comparing current data to data that had been previously collected, therefore providing a baseline for comparison. As discussed with respect to vehicles, the video glasses can be used to baseline properties before they are insured. The baseline collection can include information such as materials used in the house, finishes, appliances, and the like, facilitating the adjustment process.

Examples of baselining can include a full service inspector, using the video glasses to receive and generate data feeds to enhance the inspection process. Another example is a person such as a contractor with limited training who uses the video glasses to receive instructions on what and how to document the property for the baselining. In addition to real property, embodiments of the present invention relate to personal property. As an example, the video glasses could be used to collect data related to expensive items that are insured, providing information related to the value and/or to damage both for baselining and after occurrence of damage.

Figure 5:
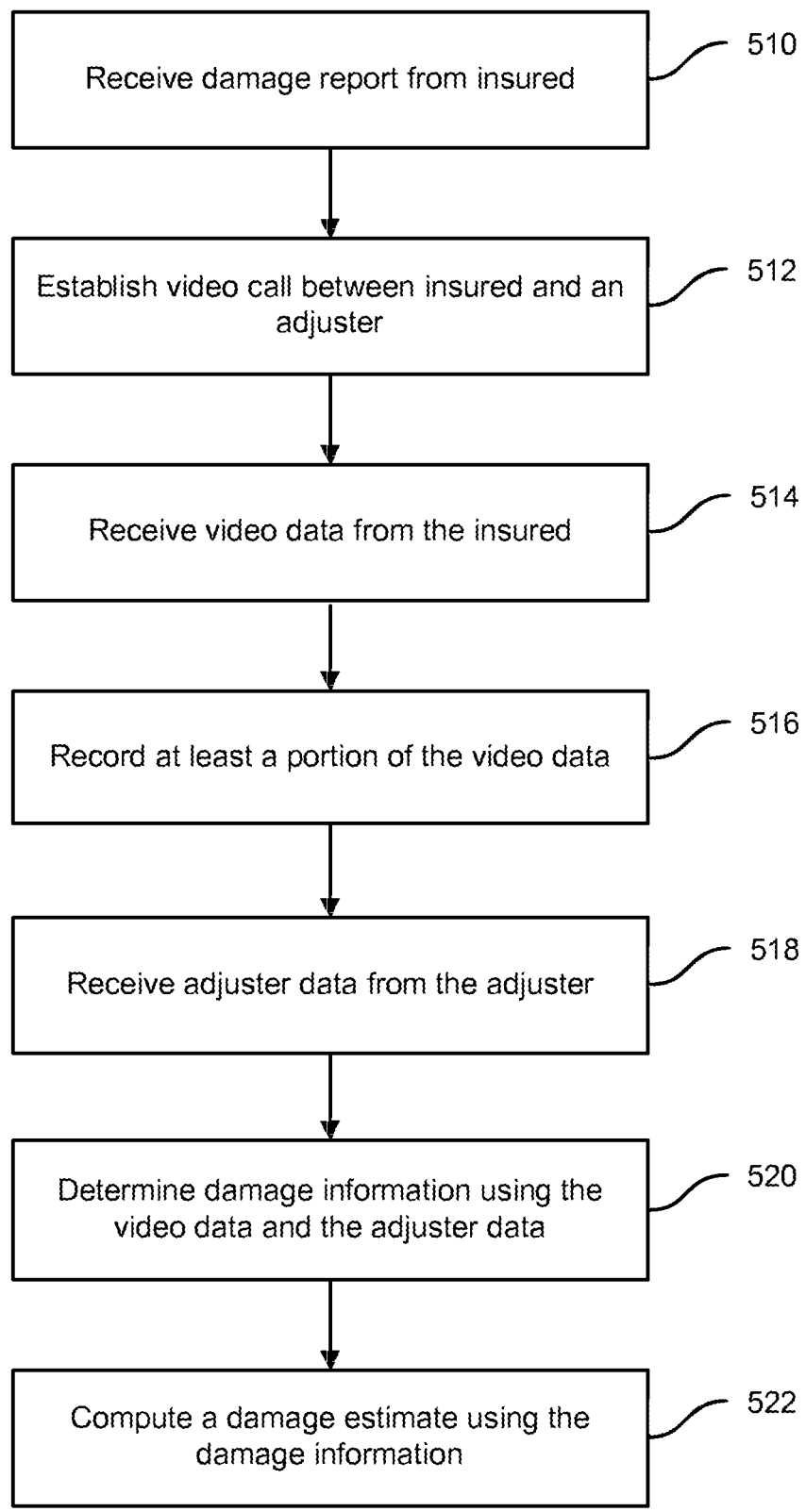
FIG. 5 is a high level flowchart illustrating a method of estimating structure damage using video data according to an embodiment of the present invention.

FIG. 5 is a high level flowchart illustrating a method of estimating structure damage using video data according to an embodiment of the present invention. The method provides an ability to estimate structure damage using video data according to embodiments of the present invention. The method includes receiving a damage report from an insured party (510) and establishing a video call between the insured party and an adjuster (512). The method also includes receiving video data from the insured party (514), recording at least a portion of the video data (516), and receiving adjuster data from the adjuster (518). The video data is collected using a mobile device in some embodiments.

The method further includes determining, using a processor, damage information using the video data and the adjuster data (520) and computing, using the processor, a damage estimate using the damage information (522). In some implementations, the method can include transmitting information related to the damage estimate to a third party, for example, a contractor. The adjuster data that is received can include adjuster notes recorded in conjunction with the video data. Embodiments of the present invention can also include receiving upgrade information from a third party and updating a repair estimate using the upgrade information. In some embodiments, the video call can be shared between more than two parties, for example, the insured, the insurer, a third party such as a contractor, or the like.

As illustrated in relation to FIG. 5, an adjuster is able to have a video conference with the insured. This communication ability enables, for claims or damage or predetermined size, the reduction or elimination of a need for an adjuster to make a physical visit to a property. The insured can be instructed through the video call to provide predetermined information to the adjuster, recording the damage, providing the adjuster with a virtual tour of the damaged property. The geo-location data associated with the video call could be utilized to verify the address or location of the property as appropriate to the particular application.

For small claims scenarios, the video call could be used to obtain information used by the insurer to settle the claim quickly. As an example, damage is viewed during the video call, damage estimates are computed, repair bids from contractors are received, agreement with the estimates and bids is confirmed with the insured, and the claim is settled with speed and efficiency. In some embodiments in which the insurer is affiliated with an integrated financial services company such as the present assignee, the claim proceeds can be deposited in the insured's bank account, closing out the claim in a single video call. Thus, embodiments of the present invention enable claim settlement at a fraction of the cost incurred during a visit by an adjuster to the property. Moreover, communication with contractors and vendors can be improved, enabling ordering of supplies and the like with high efficiency. In some embodiments, the insured can decide to perform repairs based on information obtained during the video call. The video data enables real-time interaction with contractors in a manner similar to the interaction with repair facilities as discussed in relation to vehicle damage. One of ordinary skill in the art would recognize many variations, modifications, and alternatives.

It should be appreciated that the specific steps illustrated in FIG. 5 provide a particular method of estimating structure damage using video data according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

During a claims process, an insured or an adjuster using the video glasses could be authenticated using the video glasses as described above and logged in to their account at the insurance provider, streamlining the claims process. An insured customer using the video glasses in their home that has sustained damage could put on the glasses, be authenticated using one of several technologies including a retinal scan, the shape of the user's eye, combinations thereof, and logged in to their account, inputting information into the claims process using the video glasses. When the user begins to perform the initial damage assessment, the authentication process would enable the person wearing the video glasses to access their account data previously associated with their account could be displayed in the video glasses in addition to directly inputting data into their account using the data collection features of the video glasses. In some embodiments, when the insured is interacting with a claims representative, the authentication initiates a process of the customer's account data being displayed to the claims representative. As another example, if an adjuster arrives at a location with damage, the video glasses can be used to authenticate the adjuster, the geo-location of the adjuster (which can be integrated into the video glasses or provided by other sources) can be used to determine the address and account associated with the insured's account, and the adjuster can be given appropriate system access and control based on the authentication and the location.

Figure 6:
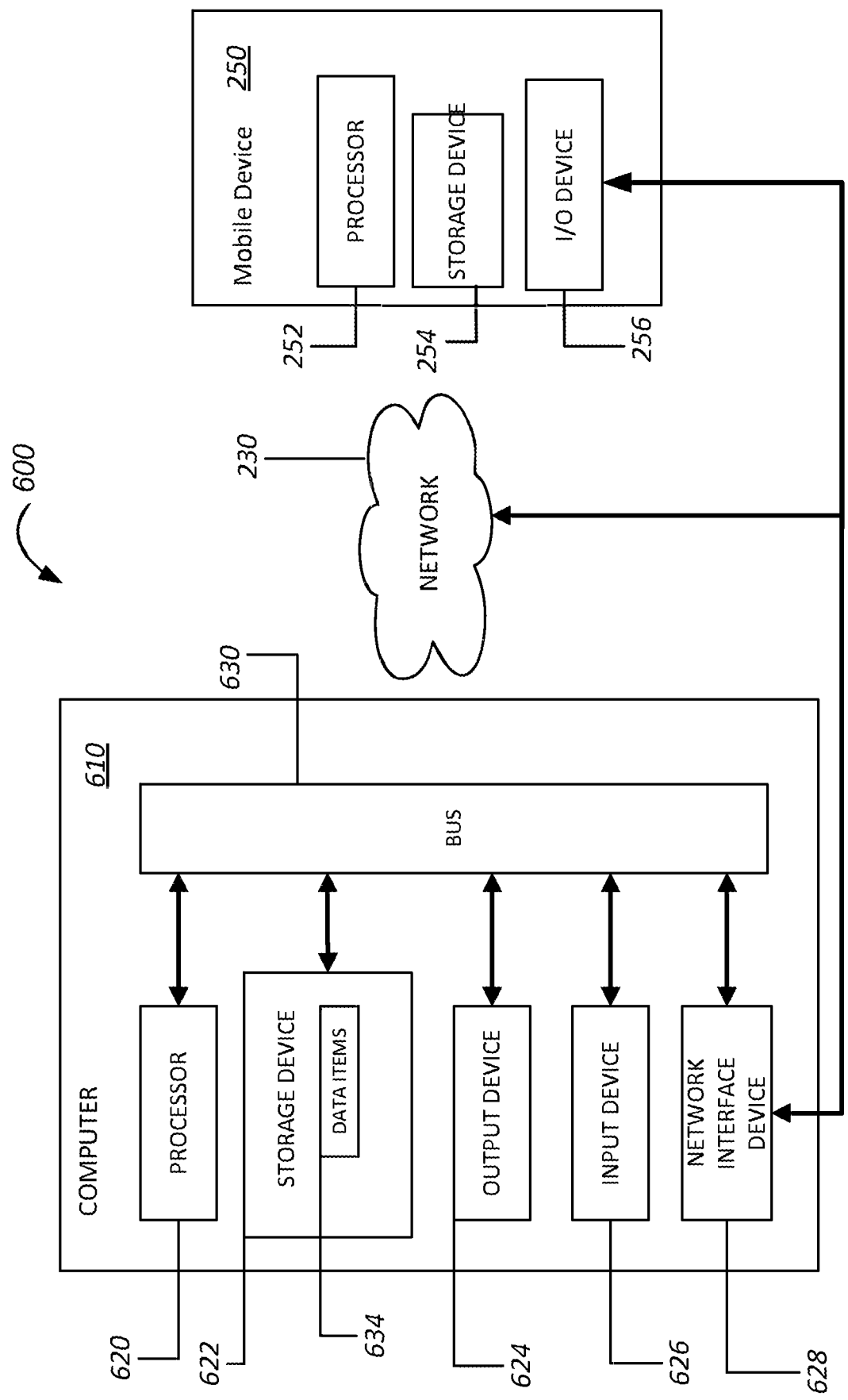
FIG. 6 is high level schematic diagram illustrating a computer system including instructions to perform any one or more of the methodologies described herein.
Figure 7:
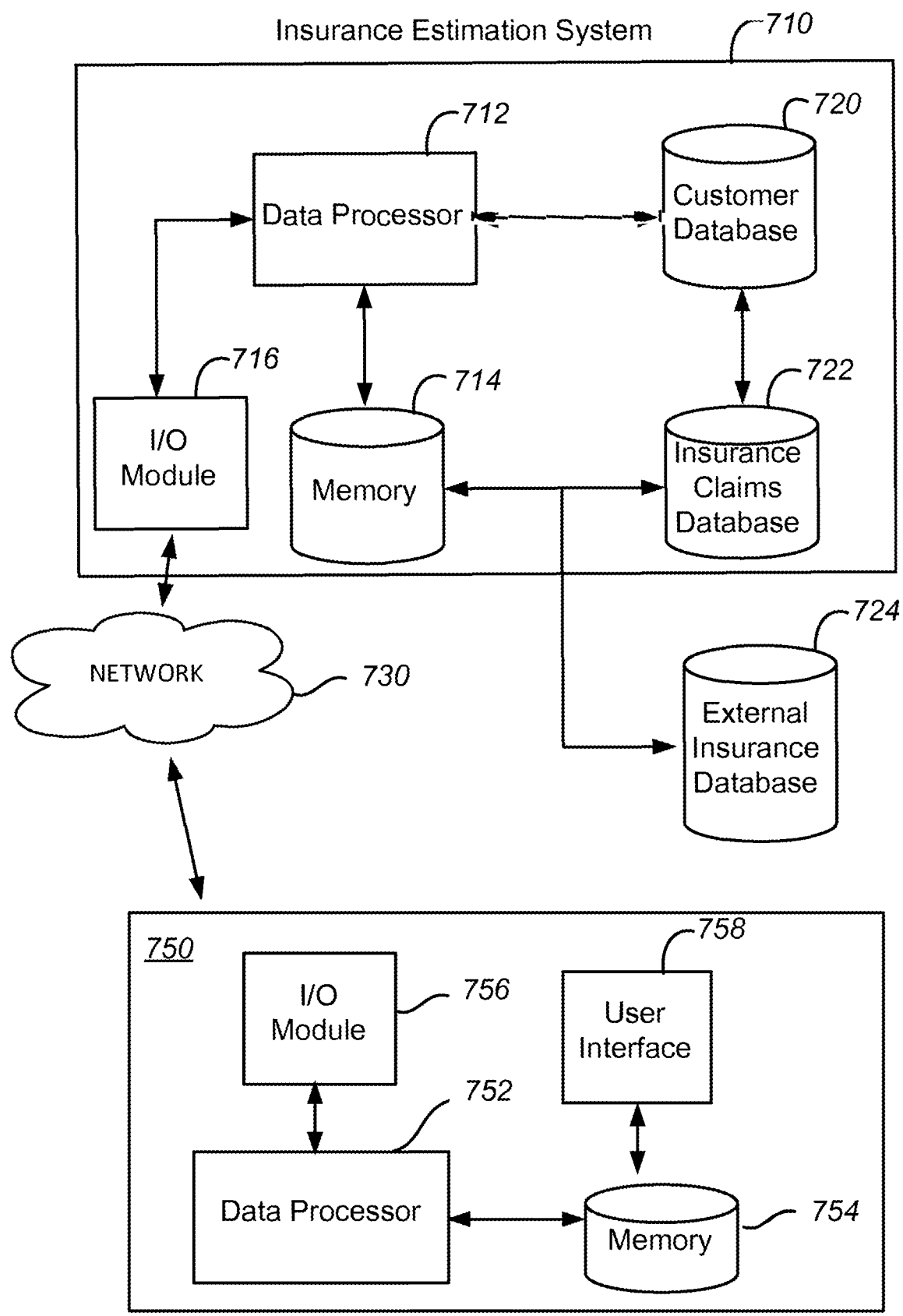
FIG. 7 is a high level schematic diagram of an insurance estimation system according to an embodiment of the present invention.

FIG. 7 is a high level schematic diagram of an insurance estimation system according to an embodiment of the present invention. As illustrated in FIG. 7 a user operating video glasses 750 interacts with the insurance estimation system 710 through network 730. The insurance estimation system 710 includes a data processor 712, also referred to as a processor, and a memory 714. The description provided in relation to processors and memory in FIG. 6 is also applicable to the data processor 712 and memory 714. An input/output (I/O) module 716 is provided to enable communication with the insurance estimation system by external users and computers.

The insurance estimation system 710 also includes a customer database 720 and an insurance claims database 722. The insurance estimation system 710 is communicatively coupled, in one example, to an external insurance database 724. In some embodiments, the data that can be stored in insurance database 722 is stored in memory 714 and insurance claims data is then obtained from the external insurance database 724. Thus, the data in the databases can be stored as illustrated or in other suitable manners. In this embodiment, insurance claims database 722, in contrast with the external insurance database 724, is maintained by the company operating the insurance estimation system 710, for example, the present assignee. In other embodiments, insurance claims database 722 is an internal database, but managed by a third party. External insurance database 724 can be a commercial database including information from third party providers such as repair companies, appraisal companies, or the like, a public database, a private database, combinations thereof, or the like.

Data processor 712 accesses information stored in customer database 720 as well as insurance claims database 722 and external insurance database 724. Customer database 720 can store data on members of an organization, which may include both existing customers and/or potential customers of an insurance company.

As described more fully throughout the present specification, the I/O module 716, the data processor 712, memory 714, customer database 720, and insurance claims database 722 are utilized to receive inputs from and provide outputs to a user operating video glasses 750. As an example, the user can be an adjuster, an insured, a contractor, or the like. The inputs can be authentication data, video data, notes, audio data, images, parts lists, and the like. The outputs provided to the user operating video glasses 750 can include data on vehicles and property, such as CAD models, wireframe data, property line data, parts lists, vendor information, and the like.

Although an external insurance database 724 is illustrated in FIG. 7, the use of such a database is not required by embodiments of the present invention. In some embodiments, insurance claims and policy data is maintained internally within the insurance estimation system. Preferably, data from both internal and external sources is integrated to provide the system operator with data that is both useful and low in cost.

A user operating video glasses 750 interacts with the insurance estimation system 710 through network 730, which may be the Internet. In some embodiments, the network 730 is partly or wholly a private wide area network, local area network, or the like. In an embodiment described in additional detail below, a user can enter information related to their insurance policy or an insurance claim using user interface 758, which results in data transfer through I/O module 756 and network 730. The information from the user can be used by the insurance estimation system 710 to determine damage sustained by vehicles, real property, personal property, and the like. The video glasses 750 can receive information from the insurance estimation system 710, process the received information using data processor 752, store the received and/or processed information using memory 754, and display the processed/stored information using the user interface 758, which may include a display device, a user input device, or other suitable interface to communicate information to and receive inputs from the user.

FIG. 6 shows a block diagram of a computer including instructions to perform any one or more of the methodologies described herein. A system 600 includes a computer 610 connected to a network 230. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 230 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 230.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 230 through any suitable communications protocol. The network interface device 628 sends and receives data items from the network 230.

The bus 630 may represent one or more busses, e.g., USB (Universal Serial Bus), PCI (Peripheral Component Interconnect), ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 230 may be any suitable network and may support any appropriate protocol suitable for communication to the computer 610. In an embodiment, the network 230 may support wireless communications. In another embodiment, the network 230 may support hard-wired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be any appropriate cellular data network or cell-based radio network technology. In another embodiment, the network 230 may be an IEEE 802.11 wireless network. In still another embodiment, the network 230 may be any suitable network or combination of networks. Although one network 230 is shown, in other embodiments any number of networks (of the same or different types) may be present.

A user computer 150 can interact with computer 610 through network 230. The user computer 150 includes a processor 152, a storage device 154, and an input/output device 156. Referring to FIG. 1, the I/O device 156 can include the I/O Module 156 and the User Interface 158. The description related to processor 620 and storage device 622 is applicable to processor 152 and storage device 154. As an example, the user computer 150 can be a personal computer, laptop computer, or the like, operated by a member of a membership organization (e.g., the present assignee). Using the user computer 150, the member can then interact with computer 610 operated by the present assignee through network 230 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It should be noted that the methods described herein can be implemented using a non-transitory computer-readable storage medium including a plurality of computer-readable instructions tangibly embodied on the computer-readable storage medium. When executed by a data processor, the instructions described herein can be implemented to perform the methods described herein. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
    providing augmented reality video glasses comprising a frame configured for wear by a wearer, at least one camera, at least one partially transparent lens integrating a display subsystem, wherein the display subsystem is configured to display data from a remote device using the at least one partially transparent lens, and a communication interface configured to transmit information collected by the augmented reality video glasses;
    authenticating, using the augmented reality video glasses, a wearer to a remote database;
    providing, to the augmented reality video glasses, stored data of a property in an undamaged state;
    collecting, using the at least one camera of the augmented reality video glasses, imagery of the property;
    displaying, to the wearer of the augmented reality video glasses using the at least one partially transparent lens, at least a portion of the stored data describing the property in an undamaged state;
    comparing the imagery of the property to the data describing the property to determine at least one anomaly associated with the property; wherein displaying data describing the property comprises overlaying imagery of the data describing the property on corresponding portions of the property through the augmented reality video glasses; and
    transmitting the imagery including the determined anomaly to a server configured to compute a damage estimate based on the anomaly.

2. The method of claim 1, wherein the data describing the property includes at least a portion of an architectural drawing.

3. The method of claim 1, wherein the data describing the property includes a computer aided design (CAD) drawing.

4. The method of claim 1, wherein the data describing the property includes infrastructure associated with a building on the property.

5. The method of claim 4, wherein the data describing the property includes a graphic representing the infrastructure.

6. The method of claim 4, wherein the infrastructure includes one or more of a pipe or an electrical chase.

7. The method of claim 1, comprising:
    causing a mobile device to communicate with the augmented reality video glasses to perform the authentication.

8. The method of claim 1, comprising:
    based on the authenticating, displaying directions to the property at least in part using the augmented reality video glasses.

9. A system, comprising:
    augmented reality video glasses comprising:
        a frame configured for wear by a wearer,
        at least one camera,
        at least one partially transparent lens integrating a display subsystem, wherein the display subsystem is configured to display data from a remote device using the at least one partially transparent lens;
        a communication interface configured to transmit information collected by the augmented reality video glasses; and
    a non-transitory computer-readable storage medium comprising a plurality of computer-readable instructions tangibly embodied on the computer-readable storage medium, which, when executed by a data processor, report an anomaly regarding a property, the plurality of instructions comprising:
    instructions that cause the data processor to authenticate, using information collected by the augmented reality video glasses, the wearer to a remote database;
    instructions that cause the processor to provide, to the augmented reality video glasses, stored data of a property in an undamaged state;
    instructions that cause the data processor to collect, using the at least one camera of the augmented reality video glasses, imagery of the property;
    instructions that cause the data processor to display, to the wearer of the augmented reality video glasses using the at least one partially transparent lens, data describing the property in an undamaged state;
    instructions that cause the data processor to compare the imagery of the property to the data describing the property to determine at least one anomaly associated with the property,
    wherein displaying data describing the property comprises overlaying imagery of the data describing the property on corresponding portions of the property through the augmented reality video glasses; and
    instructions that cause the data processor to transmit the imagery including the determined anomaly to a server configured to compute a damage estimate based on the anomaly.

10. The non-transitory computer-readable storage medium of claim 9, wherein the data describing the property includes at least a portion of an architectural drawing.

11. The non-transitory computer-readable storage medium of claim 9, wherein the data describing the property includes a computer aided design (CAD) drawing.

12. The non-transitory computer-readable storage medium of claim 9, wherein the data describing the property includes infrastructure associated with a building on the property.

13. The non-transitory computer-readable storage medium of claim 12, wherein the data describing the property includes a graphic representing the infrastructure.

14. The non-transitory computer-readable storage medium of claim 12, wherein the infrastructure includes one or more of a pipe or an electrical chase.

15. The non-transitory computer-readable storage medium of claim 12, wherein the instructions when executed by the data processor:
   display directions to the property at least in part using the augmented reality video glasses.

16. A system configured to execute instructions that effectuate:
   authenticating, using information collected by augmented reality video glasses, a wearer to a remote database, wherein the augmented reality video glasses comprise a frame configured for wear by the wearer, at least one camera, at least one partially transparent lens integrating a display subsystem, wherein the display subsystem is configured to display data from a remote device using the at least one partially transparent lens, and a communication interface configured to transmit information collected by the augmented reality video glasses;
   providing, to the augmented reality video glasses, stored data of a property in an undamaged state;
   collecting, using the at least one camera of the augmented reality video glasses, imagery of the property;
   displaying, to the wearer of the augmented reality video glasses using the at least one partially transparent lens, at least a portion of the stored data describing the property in an undamaged state;
   comparing the imagery of the property to the data describing the property to determine at least one anomaly associated with the property; wherein displaying data describing the property comprises overlaying imagery of the data describing the property on corresponding portions of the property through the augmented reality video glasses; and
   transmitting the imagery including the determined anomaly to a server configured to compute a damage estimate based on the anomaly.

17. The system of claim 16, wherein the wearer is the user.

18. The system of claim 16, the instructions configured to effectuate:
   causing a mobile device to communicate with the augmented reality video glasses to perform the authentication.

19. The system of claim 16, the instructions configured to effectuate:
   based on the authenticating, displaying directions to the property at least in part using the augmented reality video glasses.

20. The method of claim 1, comprising:
   causing the server to report the damage estimate to a repair vendor.

\* \* \* \* \*